May 23, 1961 R. M. MENNESSON 2,985,186
PRESSURE REGULATING APPARATUS, IN PARTICULAR
FOR PNEUMATIC MEASUREMENT INSTRUMENTS
Filed March 18, 1958 2 Sheets-Sheet 1

INVENTOR
Robert Maurice Mennesson
BY
Bailey, Stephens & Huettig
ATTORNEYS

United States Patent Office 2,985,186
Patented May 23, 1961

2,985,186

PRESSURE REGULATING APPARATUS, IN PARTICULAR FOR PNEUMATIC MEASUREMENT INSTRUMENTS

Robert Maurice Mennesson, Neuilly-sur-Seine, France, assignor to Societe d'Applications et de Constructions pour Materiel Automobile (S.A.C.M.A.), Neuilly-sur-Seine, France, a society of France Filed Mar. 18, 1958, Ser. No. 722,233

Claims priority, application France Mar. 28, 1957

7 Claims. (Cl. 137—115)

The present invention relates to pressure regulating apparatus, i.e. to apparatus for maintaining a constant pressure of gaseous fluid in a chamber communicating with the outside thereof and in particular with a space to be fed with fluid from said chamber at constant pressure. The invention is more especially concerned with apparatus of this kind intended to supply air at constant pressure to pneumatic measurement apparatus.

The object of this invention is to provide an apparatus of the above mentioned kind which is better adapted to meet the requirements of practice than those known up to this time, especially from the points of view of simplicity and safety of operation.

For this purpose, according to the invention said chamber is made to communicate, on the one hand, through a narrow orifice, with a reservoir where the pressure is substantially constant and such that said constant pressure to be maintained in said chamber is intermediate between the atmospheric pressure and said pressure in said reservoir, and on the other hand with one of the ends of a funnel shaped expansion passage the other end of which communicates with the atmosphere, this passage having its larger end at the top and containing a disc capable of floating freely therein, the whole being arranged in such manner that this disc is lifted against the action of gravity by the combined effects of the pressure existing in said chamber, which pressure acts upon one of the faces of said disc, and of the atmospheric pressure, which acts upon the opposed face, this disc carrying a downward extension immersed in a liquid capable of damping, without braking them, the displacements of the discs, whereby said disc occupies a balanced position such that the pressure existing in the chamber has a constant value.

Preferred embodiments of this invention will be hereinafter described with reference to the accompanying drawings, given merely by way of example and in which.

Figure 1:
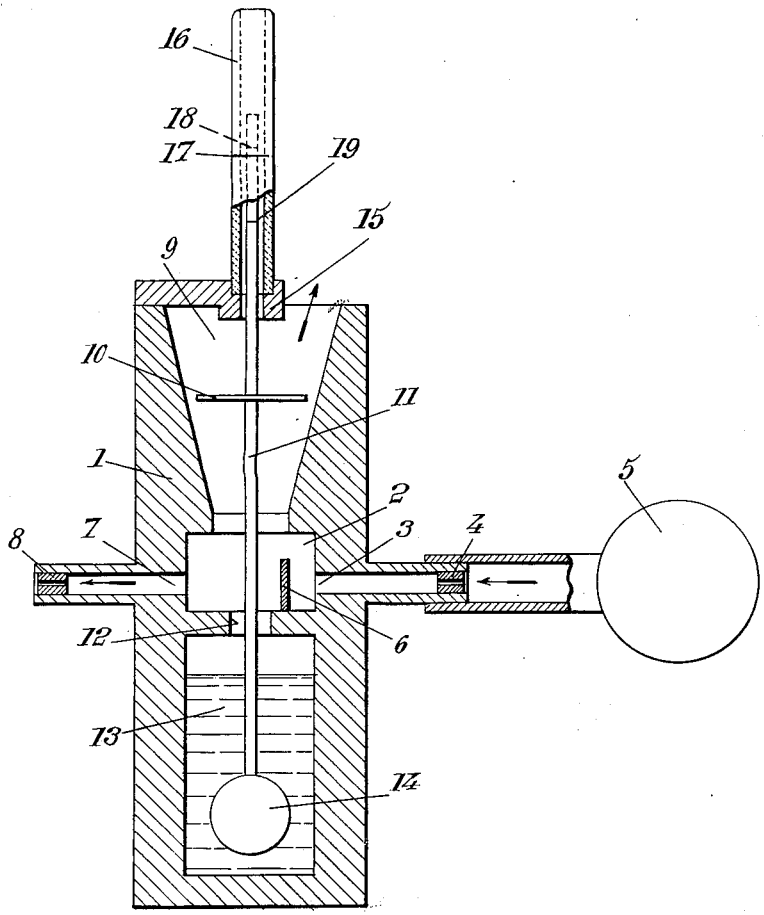
Fig. 1 is a diagrammatic vertical sectional view of a first embodiment of the invention.

The body 1 of the apparatus shown by Fig. 1 forms a chamber 2 into which air at a pressure above atmospheric pressure is fed from a reservoir 5 through a calibrated hole 4 and a conduit 3. The pressure in reservoir 5 is not a constant pressure but should not vary too much.

A baffle 6 is located in chamber 2 opposite the outlet of conduit 3 to break the air jet issuing from said conduit. The same result might be obtained by causing said conduit to open obliquely into chamber 2. 7 is an outlet conduit leading to an outlet nozzle 8 which opens into a space at a pressure lower than or equal to the predetermined constant pressure to be obtained.

In communication with chamber 2 and above it, there is a funnel shaped expansion passage 9 preferably frustoconical and having a vertical axis. Passage 9 opens at the top into the atmosphere.

Inside this passage, there is mounted a horizontal disc 10 (preferably circular, same as the horizontal cross-sections of passage 9) mounted on a rod 11. Rod 11 extends downwardly through a passage 12 formed in the bottom wall of chamber 2 into a tank 13 containing a liquid. The lower end of rod 11 carries a ball 14 immersed in the liquid. This liquid is little volatile and of relatively high viscosity (such as a mineral or synthetic oil in particular a silicone oil). The top of rod 11, above disc 10, passes freely through a ring 15 so as to extend coaxially in a transparent tube 16. Tube 16 carries a mark 17 and rod 11 carries two marks 18 and 19.

The structure constituted by disc 10, rod 11 and ball 14 is free to move vertically under the opposed actions of its apparent weight (account being taken of the upward thrust exerted by liquid 13 on ball 14) and of the thrust exerted on disc 14 by the air fed under pressure to chamber 2.

The apparatus is advantageously adjusted to comply with the following conditions:

(a) When ball 14 is resting on the bottom of tank 13, there is a slight clearance between disc 10 and the wall of passage 9, the upper mark 18 of the rod being at the level of the fixed mark 17 on tube 16, or slightly below it;

(b) When disc 10 is abutting against ring 15 the lower mark 19 of the rod is at the level of the fixed mark 17, or slightly above it.

This apparatus works as follows:

If, initially, the feed pressure from reservoir 5 is zero, ball 14 is resting upon the bottom of tank 13.

If now, the feed pressure is gradually increased, disc 10 is lifted and the mark 18 of the rod passes above mark 17. When the feed pressure from reservoir 5 is further increased, disc 10 is lifted more and more until finally mark 19 passes above mark 17. From this time on, the pressure in chamber 2 is no longer constant, same as it was not constant when ball 14 was resting upon the bottom of tank 13. But as long as marks 18 and 19 are located on opposite sides of fixed mark 17, the pressure in chamber 2 is practically constant.

However some precautions are to be taken. For instance, the portion of rod 11 immersed in the liquid in tank 13 must be of very small diameter so that vertical displacements of the rod do not substantially modify the apparent weight of the structure constituted by elements 10—11—14.

Furthermore, the mean diameter of passage 9 must be sufficiently large to prevent the air flowing past disc 10 from undergoing, either upstream or downstream of disc 10, substantial pressure loss variations when said disc 10 is moving between its limits of displacement.

If these conditions are complied with, the pressure exerted by the air in chamber 2 on the under face of disc 10 exactly balances the apparent weight of structure 10—11—14, account being taken of the fact that ball 14 and a portion of rod 11 are immersed in the liquid.

Since this apparent weight is practically constant (save for the variations of immersion of rod 11), the pressure in chamber 2 is also practically constant.

Of course, if instead of varying the pressure in reservoir 5, the cross-section of outlet nozzle 8 had been varied, the result would have been the same, the action of the pressure in chamber 2 balancing the apparent weight of structure 10—11—14.

The immersion of ball 14 in a liquid serves to damp the oscillations of this structure.

The apparatus of Fig. 2, where similar parts are designated by the same reference numerals, is based on the same principle, but in this case, the pressure to be maintained in chamber 2 is below atmospheric pressure (the air circulation taking place from 8 toward 4), and passage 9 has its upper and larger end in direct communication with said chamber 2; the other end of passage 9 communicates with the atmosphere through a passage 20.

Of course, in this case a cover 21 is fitted on the top of chamber 2, said cover being provided with a hole 22 equivalent to the passage through ring 5 in Fig. 1.

Figure 2:
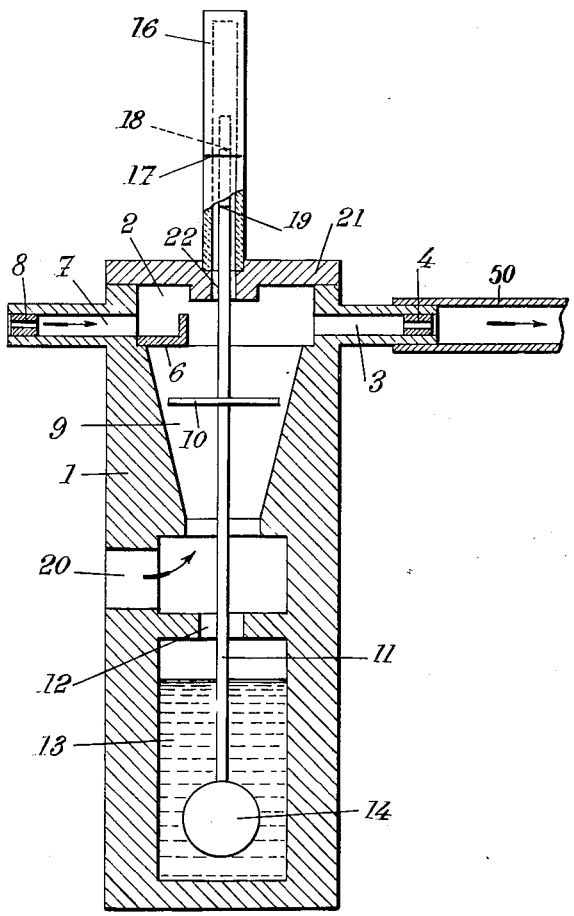
Fig. 2 is a similar view of another embodiment.

The operation of the apparatus of Fig. 2 is practically identical to what has been above described with reference to Fig. 1.

Member 14 is not necessarily spherical and might be in the form of a mere horizontal plate. As for the gaseous fluid flowing through chamber 2 it is not necessarily air.

In a general manner, while I have, in the above description, disclosed what I deem to be practical and efficient embodiment of my invention, it should be well understood that I do not wish to be limited thereto as there might be changes made in the arrangement, disposition and form of the parts without departing from the principle of the present invention as comprehended within the scope of the accompanying claims.

What I claim is:

1. An apparatus for maintaining a constant gaseous fluid pressure different from atmospheric pressure in a chamber provided with two orifices, an inlet one and an outlet one, respectively, one of said orifices communicating with the outside of said chamber for transmitting said constant pressure thereto, which apparatus comprises, in combination, a space containing a gaseous fluid at a pressure such that said constant pressure to be maintained in said chamber is always intermediate between the pressure in said space and atmospheric pressure, conduit means for connecting said space with the other of said orifices, said last mentioned orifice having a restricted cross-section area, a funnel extending vertically between said chamber and the atmosphere, the cross section of said funnel decreasing from its top to its bottom, means forming below said chamber and said funnel a container filled with a liquid, and a vertically movable unit comprising a disc disposed in said funnel and transverse to the vertical direction thereof, the area of said disc being intermediate between the top cross section and the bottom cross section of said funnel, and, under said disc, a downward extension rigid therewith and having its lower end immersed in said liquid, said unit being freely slidable with respect to said chamber and said funnel, forces acting on said movable unit and which are the pressure in said chamber acting on one face of said disc, the Archimedean thrust exerted by said liquid on said extension lower end, the weight of said unit and the atmosphere pressure acting on the other face of said disc, have a resultant which produces a vertical displacement of said unit until it is brought into a balanced position where said resultant becomes zero.

2. An apparatus for maintaining a constant gaseous fluid pressure higher than atmospheric pressure in a chamber provided with two orifices, an inlet one and an outlet one, respectively, said outlet orifice communicating with the outside of said chamber for transmitting said constant pressure thereto, which apparatus comprises, in combination, a space containing a gaseous fluid at a pressure always higher than said constant pressure to be maintained in said chamber, conduit means for connecting said source with said inlet orifice, said inlet orifice having a restricted cross-section area, a funnel extending vertically above said chamber and forming a communication passage between said chamber and the atmosphere, the cross section of said funnel decreasing from its top to its bottom, means forming below said chamber a container filled with a liquid, and a vertically movable unit comprising, above said chamber, a disc disposed in said funnel and transverse to the vertical direction thereof, the area of said disc being intermediate between the top cross section and the bottom cross section of said funnel, and, under said disc, a downward extension rigid therewith and having its lower end immersed in said liquid, said unit being freely slidable with respect to said chamber and said funnel, whereby the forces acting on said movable unit and which are the pressure in said chamber acting on the under face of said disc, the Archimedean thrust exerted by said liquid on said extension lower end, the weight of said unit and the atmospheric pressure acting on the upper face of said disc, having a resultant which produces a vertical displacement of said unit until it is brought into a balanced position where said resultant becomes zero.

3. An apparatus according to claim 2 further including baffle means in said chamber for breaking the gaseous fluid jet entering said chamber through said inlet orifice.

4. An apparatus for maintaining a constant gaseous fluid pressure lower than atmospheric pressure in a chamber provided with two orifices, an inlet one and an outlet one, respectively, said inlet orifice communicating with the outside of said chamber for transmitting said constant pressure thereto, which apparatus comprises, in combination, a space containing gaseous fluid at a pressure always lower than said constant pressure to be maintained in said chamber, conduit means for connecting said space with said outlet orifice, said outlet orifice having a restricted cross-section area, a funnel extending vertically below said chamber and forming a communication passage between said chamber and the atmosphere, the cross section of said funnel decreasing from its top to its bottom, means forming below said funnel a container filled with a liquid, and a vertically movable unit comprising, below said chamber, a disc disposed in said funnel and transverse to the vertical direction thereof, the area of said disc being intermediate between the top cross section and the bottom cross section of said funnel, and, under said disc, a downward extension rigid therewith and having its lower end immersed in said liquid, said unit being freely slidable with respect to said chamber and said funnel, whereby the forces acting on said movable unit and which are the pressure in said chamber acting on the upper face of said disc, the Archimedean thrust exerted by said liquid on said extension lower end, the weight of said unit and the atmospheric pressure acting on the under face of said disc, have a resultant which produces a vertical displacement of said unit until it is brought into a balanced position where said resultant becomes zero.

5. An apparatus according to claim 4 further including baffle means in said chamber for breaking the fluid jet entering said chamber through said inlet orifice.

6. An apparatus according to claim 1 in which said downward extension includes a rod rigid with said disc and a ball carried by the lower end of said rod.

7. An apparatus according to claim 1 further including abutment means fixed with respect to said chamber for limiting the displacements of said movable unit and cooperating marking means carried respectively by said unit and by one of said abutment means to indicate the positions taken by said disc with respect to said funnel.

References Cited in the file of this patent

UNITED STATES PATENTS

| 1,063,933 | Keller | June 3, 1913 |
| 1,231,293 | Peters | June 26, 1917 |
| 2,234,798 | Craig | Mar. 11, 1941 |
| 2,838,205 | Booth | June 10, 1958 |
| 2,844,161 | Ostwald | July 22, 1958 |
| 2,862,513 | Mercier et al. | Dec. 2, 1958 |
| 2,917,067 | Pearl | Dec. 15, 1959 |

FOREIGN PATENTS

| 893,865 | France | Feb. 28, 1944 |